(12) United States Patent
Elder et al.

(10) Patent No.: US 7,925,896 B2
(45) Date of Patent: Apr. 12, 2011

(54) HARDWARE KEY ENCRYPTION FOR DATA SCRAMBLING

(75) Inventors: Garry R. Elder, Rockwall, TX (US); Ramanujam Thodur, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 995 days.

(21) Appl. No.: 11/690,651

(22) Filed: Mar. 23, 2007

(65) Prior Publication Data
US 2007/0258582 A1    Nov. 8, 2007

Related U.S. Application Data

(60) Provisional application No. 60/743,995, filed on Mar. 30, 2006.

(51) Int. Cl.
*G06F 11/30* (2006.01)
*G06F 12/14* (2006.01)
(52) U.S. Cl. ............... 713/193; 713/192; 380/28
(58) Field of Classification Search ......... 713/193, 713/192; 380/29, 28
See application file for complete search history.

(56) References Cited

U.S. PATENT DOCUMENTS

| | | | |
|---|---|---|---|
| 4,747,139 A | 5/1988 | Taaffe | |
| 6,084,969 A | 7/2000 | Wright et al. | |
| 6,278,783 B1 * | 8/2001 | Kocher et al. | 380/277 |
| 6,523,119 B2 * | 2/2003 | Pavlin et al. | 713/192 |
| 6,687,683 B1 | 2/2004 | Harada et al. | |
| 6,690,795 B1 | 2/2004 | Richards | |
| 6,920,221 B1 * | 7/2005 | Faber et al. | 380/200 |
| 6,922,785 B1 * | 7/2005 | Brewer et al. | 713/153 |
| 7,024,564 B2 * | 4/2006 | Pavlin et al. | 713/192 |
| 7,093,295 B1 * | 8/2006 | Saito | 726/26 |
| 7,120,799 B2 * | 10/2006 | Leung et al. | 713/189 |
| 7,231,373 B2 | 6/2007 | Kidd et al. | |
| 7,278,016 B1 * | 10/2007 | Detrick et al. | 713/2 |
| 7,478,235 B2 * | 1/2009 | England et al. | 713/153 |
| 7,636,844 B2 * | 12/2009 | Bajikar | 713/171 |
| 2001/0056539 A1 * | 12/2001 | Pavlin et al. | 713/193 |
| 2002/0108051 A1 * | 8/2002 | Fougeroux et al. | 713/193 |
| 2003/0110388 A1 * | 6/2003 | Pavlin et al. | 713/190 |
| 2003/0177401 A1 | 9/2003 | Arnold | |
| 2005/0114697 A1 * | 5/2005 | Cornell et al. | 713/200 |

(Continued)

FOREIGN PATENT DOCUMENTS

JP    2006295405    10/2006

OTHER PUBLICATIONS

Morozov et al., Hardware Key for Inforamtion Systems Users Authentification, 2004, TCSET, ACM.*

(Continued)

*Primary Examiner* — David García Cervetti
(74) *Attorney, Agent, or Firm* — John J. Patti; Wade J. Brady, III; Frederick J. Telecky, Jr.

(57) ABSTRACT

Apparatus and method to scramble data prior to placing it on a bus or in memory uses embedded hardware keys for encryption/decryption. The hardware keys may be used in addition to software encryption. Different hardware keys may be used to process most significant bits and least significant bits of a data word. Different hardware keys may be used to process messages from/to different channels. The hardware key may be comprise a series of fixed logic cells.

3 Claims, 1 Drawing Sheet

U.S. PATENT DOCUMENTS

| | | | |
|---|---|---|---|
| 2005/0177504 A1* | 8/2005 | Crosson Smith | 705/40 |
| 2005/0232415 A1* | 10/2005 | Little et al. | 380/28 |
| 2005/0289355 A1* | 12/2005 | Kitariev et al. | 713/182 |
| 2006/0041934 A1* | 2/2006 | Hetzler | 726/9 |
| 2006/0067528 A1 | 3/2006 | Kimura | |
| 2006/0242465 A1* | 10/2006 | Cruzado et al. | 714/30 |
| 2006/0242696 A1* | 10/2006 | Cruzado et al. | 726/16 |
| 2007/0043978 A1* | 2/2007 | Cruzado et al. | 714/38 |
| 2007/0044158 A1* | 2/2007 | Cruzado et al. | 726/27 |
| 2007/0192874 A1* | 8/2007 | Tucker | 726/27 |

OTHER PUBLICATIONS

Cilardo et al., An FPGA-based Key-Store for Improving the Dependability of Security Services, 2005, IEEE.*

"DES Encryption," at http://www.tropsoft.com/strongenc/des.htm.

"Triple DES" at http://www.tropsoft.com/strongenc/des3.htm.

U.S. Appl. No. 11/859,131, filed Sep. 21, 2007.

* cited by examiner

HARDWARE KEY ENCRYPTION FOR DATA SCRAMBLING

FIG. 1 shows a data system wherein data in the form of a key program message 122, 124 is received on a bus 160, 162 is encrypted using a software key, such as a conventional DES or triple DES algorithm encryption. Then, to further secure the data against detection of the transmitted data and/or software key used for encryption, the data is further subjected to a hardware key encryption 136, 134 using a hardware key 114, 116, before being transmitted to a memory bus 150 and then to a memory 110. The data is thus delivered to the bus 150 for storage in both software and hardware encrypted form. At retrieval from memory 110, the process is reversed, with the retrieved data first subjected to a hardware decryption 130, 132 and then, either then or later, subjected to a software decryption.

BACKGROUND

As shown in FIG. 1, to make hacking harder, one hardware encryption key 114 can be used for most significant bits 118 of a data word and another 116 for least significant bits 120 (HW KEY 1, HW KEY 2). Likewise, software control can be implemented, so messages received from or delivered to one communication channel, application program, etc., can be encrypted/decrypted by one hardware key; while those from or to another communication channel, application program, etc., are encrypted/decrypted by another hardware key.

SUMMARY

This invention provides apparatus and method to scramble the data prior to placing the data on the bus or in memory.

In one aspect of the invention, an embedded hardware key is used in the encrypt/decrypt process. In an example embodiment, the hardware key comprises a series of fixed logic cells. The number of cells embedded within the hardware can be larger than the actual number of cells required for the key.

The use of embedded keys within the hardware logic makes the detection and reverse engineering of the encrypt/decrypt process much more difficult, time consuming and hence costly. The key is much harder to find making the reverse engineering process more costly.

DETAILED DESCRIPTION

Figure 1:
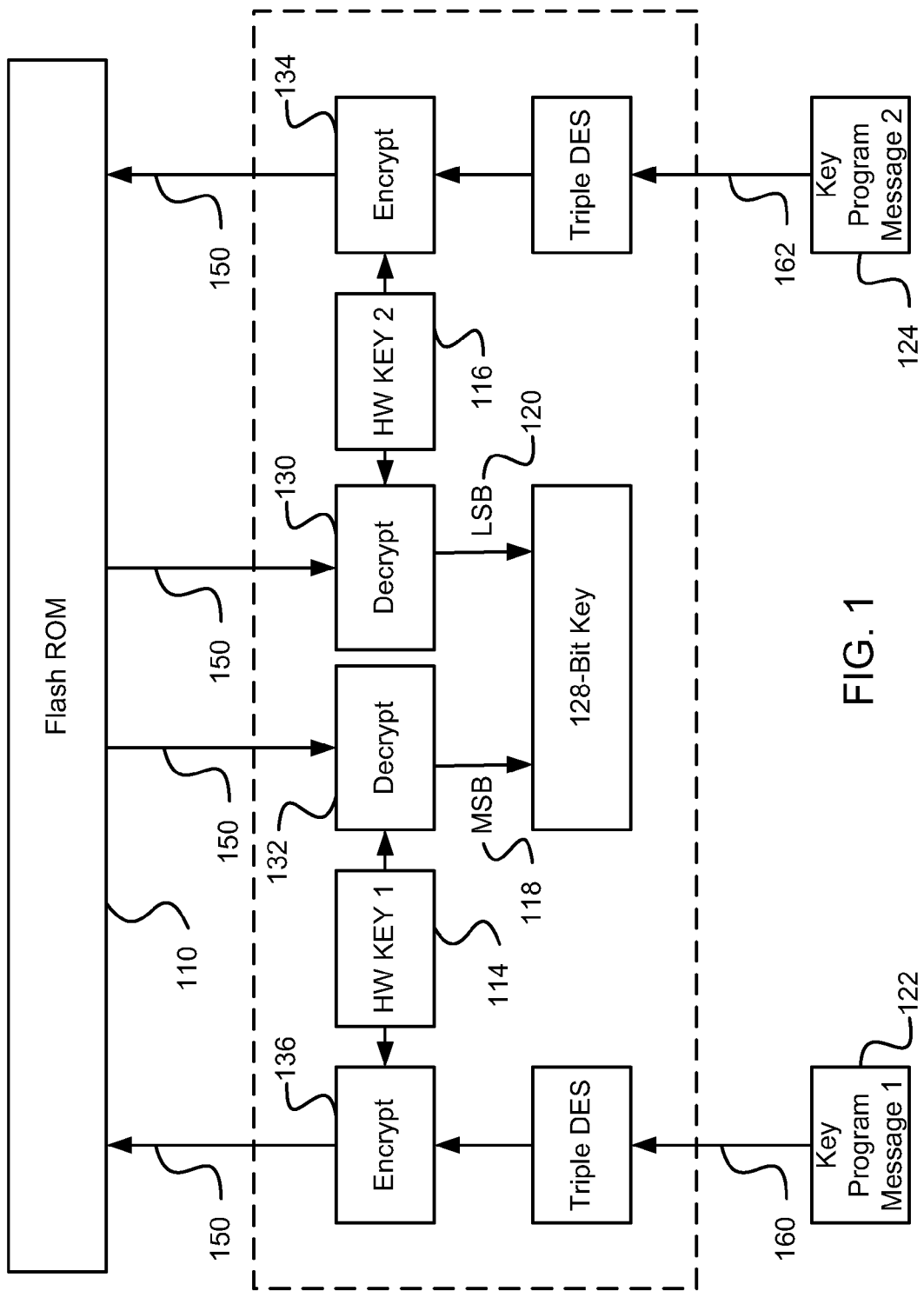
FIG. 1 shows an example embodiment for an encryption/decryption implementation in accordance with principles of the invention.

Data Encryption Standard (DES) refers to a widely used data encryption/decryption algorithm developed by IBM and adopted as a U.S. federal standard in 1976 by the National Institute of Standards and Technology (NIST). "Triple DES" is a more robust implementation of DES that can be adapted to DES applications to provide greater security. Additional work is being done to increase security further for such coding schemes.

FIG. 1 shows a data system wherein data in the form of a key program message is received on a bus is encrypted using a software key, such as a conventional DES or Triple DES algorithm encryption. Then, to further secure the data against detection of the transmitted data and/or software key used for encryption, the data is further subjected to a hardware key encryption using a hardware key, before being transmitted to a memory bus and then to a memory. The data is thus delivered to the bus for storage in memory in both software and hardware encrypted form. At retrieval from memory, the process is reversed, with the retrieved data first subjected to a hardware decryption and then, either then or later, subjected to a software decryption.

As shown in FIG. 1, to make hacking harder, one hardware encryption key can be used for most significant bits of a data word and another for least significant bits (HW KEY 1, HW KEY 2). Likewise, software control can be implemented, so messages received from or delivered to one communication channel, application program, etc., can be encrypted/decrypted by one hardware key; while those from or to another communication channel, application program, etc., are encrypted/decrypted by another hardware key.

In a preferred implementation, the hardware encryption/decryption mechanism is positioned in a data communication system, to minimize hacking of data at more vulnerable parts of the system. For example, data encrypted over an internet channel that is normally decrypted within a local system, can be hardware encrypted for remote elements of the local system (viz., for delivery from a pc to shared storage). In another example, encryption is done in a cellphone between the receiver decoded call and a local memory storage of sensitive information. In one implementation, the functional blocks shown within the dashed lines in FIG. 1 may be implemented on a single integrated circuit chip, so that all communications off the chip are encrypted. For example, the messages that are received from external sources in Triple DES encryption are decrypted, then encrypted using the local hardware key or keys before transmission onto a local bus, such as for delivery to a flash ROM memory.

The hardware keys may each comprise a series of fixed logic cells.

Those skilled in the art to which the invention relates will appreciate that the many other embodiments and variations of the described example embodiments exist within the scope of the invention.

What is claimed is:

1. A system for protecting data, the system comprising:
    a data bus;
    a memory bus;
    a memory that is coupled to the memory bus;
    a software encoder that encrypts a message from the data bus and generates a first encrypted message;
    first embedded hardware key;
    a second embedded hardware key; and
    hardware encoder that is coupled to the data bus, wherein the hardware encoder encrypts the most significant bits of the first encrypted message with the first hardware key to generate a first portion of a second encrypted message, and wherein the encoder encrypts the least significant bits of the first encrypted message with the second embedded hardware key to generate a second portion of a second message, and wherein the hardware encoder transmits the second encrypted message to the memory over the memory bus.

2. The system of claim 1, wherein the system further comprises a hardware decoder that is coupled to the memory bus and that is adapted to decrypt the most significant bits and least significant bits of a message received from the memory bus with the first and second hardware keys, respectively.

3. The system of claim 2, wherein the first and second hardware keys each further comprises a plurality of fixed logic cells.

* * * * *